United States Patent
Tange

(10) Patent No.: US 7,188,430 B2
(45) Date of Patent: Mar. 13, 2007

(54) CONTINUOUSLY VARIABLE TRANSMISSION BELT INSPECTION DEVICE

(75) Inventor: Hiroshi Tange, Fuji (JP)

(73) Assignee: Jatco Ltd (JP)

( * ) Notice: Subject to any disclaimer, the term of this patent is extended or adjusted under 35 U.S.C. 154(b) by 0 days.

(21) Appl. No.: 11/111,847

(22) Filed: Apr. 22, 2005

(65) Prior Publication Data

US 2005/0241170 A1    Nov. 3, 2005

(30) Foreign Application Priority Data

Apr. 27, 2004    (JP)    ............... 2004-131157

(51) Int. Cl.
*G01B 3/30*    (2006.01)
(52) U.S. Cl. ............... 33/544.4; 33/501.45; 33/567
(58) Field of Classification Search ............... 33/544.4, 33/501.05, 501.06, 501.08, 501.45, 531, 33/542, 567, 567.1
See application file for complete search history.

(56) References Cited

U.S. PATENT DOCUMENTS

| | | | | |
|---|---|---|---|---|
| 69,954 A | * | 10/1867 | Richards | 33/544.4 |
| 386,469 A | * | 7/1888 | Howard | 33/542 |
| 2,536,401 A | * | 1/1951 | Victor | 33/567 |
| 2,786,277 A | * | 3/1957 | Zifferer | 33/544.4 |
| 4,112,355 A | * | 9/1978 | Gibson et al. | 33/542 |
| 4,584,774 A | * | 4/1986 | Link | 33/567 |
| 6,901,672 B1 | * | 6/2005 | Reilly | 33/567 |

FOREIGN PATENT DOCUMENTS

| | | |
|---|---|---|
| JP | 07-225 101 | 8/1995 |
| JP | 09-079 804 | 3/1997 |
| JP | 09-229664 | 9/1997 |
| JP | 10-103 943 | 4/1998 |
| JP | 2000-266 130 | 9/2000 |
| JP | 2001-336 903 | 12/2001 |

OTHER PUBLICATIONS

Netherlands Search Report, Dec. 12, 2005.

* cited by examiner

*Primary Examiner*—Christopher W. Fulton
(74) *Attorney, Agent, or Firm*—Blank Rome LLP

(57) ABSTRACT

An inspection device designed for a large number of consecutively attached metal elements punched and processed into a specified shape and for inspecting clearance between said metal elements of a continuously variable transmission belt which are assembled to support a laminated band of a metal stepless belt; a wedge-shaped inspection jig, for example, used for inspecting quantitatively the clearance value with an inspection jig structure of a modified hexahedron having six surfaces containing an upper surface and a lower surface opposing four side surfaces of which both of two side surfaces are a rectangle and the remaining two side surfaces are a wedge-shape which becomes gradually narrower in width from an upper part to a lower part.

5 Claims, 7 Drawing Sheets

PRIOR ART

PRIOR ART

CONTINUOUSLY VARIABLE TRANSMISSION BELT INSPECTION DEVICE

BACKGROUND OF THE INVENTION

1. Field of the Invention

The present invention relates to Continuously Variable Transmission (CVT) belt inspection device, and more particularly relates to a CVT belt inspection device designed for a large number of stacked layer metal elements punched and processed into a specified shape and assembled to support a laminated band of a metal stepless belt (hereinafter denoted as "steel belt")

2. Description of the Related Art

FIG. 6 is an outline view of a CVT belt. In this diagram, a CVT belt 1 is constructed by assembling two belt laminated bands 2 composed of a plurality of steel belt bands (for example, a laminated band composed of about 12 endless belt layers) which are supported by consecutively attached elements 3 composed of a large number of metal elements 3a (for example, about 400 steel elements).

FIG. 7 is an enlarged view of a metal element 3a. The metal element 3a consisting of a cast steel block (small piece of metal) punched and processed into a specified shape, for example, a shape resembling the upper body image of a human individual. Specifically, the metal element 3a resembles a molded shape having a head portion 3b and a chest portion 3c, along with a neck portion 3d which connects between the head portion 3b and the chest portion 3c.

The head portion 3b has a protrusion 3e (raised circular knurl) formed in one direction of the surface side and a recess 3f (circular indent) formed in the same location on the opposite direction surface side. Alignment of the metal elements 3a is accomplished by consecutively inserting the protrusion 3e into the recess 3f of adjoining metal elements 3a. Two belt laminated bands 2 are inserted into the concave portions 3g (belt slots) formed in the metal elements 3a between the head portion 3b and the chest portion 3c, respectively.

In this manner, the CVT belt 1 for example is assembled with two belt laminated bands 2 composed of about 12 layers of steel belt sheets supported by stacked elements 3 composed of about 400 metal elements 3a. However, when assembled, the number of thin plate metal elements 3a must be adjusted accordingly. When there are an excessive number of the metal elements 3a, the CVT belt 1 has impaired flexibility. Conversely, when there are an insufficient number of metal elements 3a, the attachment between adjoining elements becomes slack.

Therefore, conventionally in the process of assembling a CVT belt 1, the "clearance" ("clearance" in this specification refers to the clearance produced when widening (spreading apart) by predetermined force) between the metal elements 3a consecutively attached to the belt laminated bands 2 is measured with a "feeler gauge." If the clearances are too wide and the total number of plates is judged as insufficient, an adjustment is made to insert more of the metal elements 3a. On the other hand, if the clearances are too narrow and the total number of plates is judged as excessive, an adjustment is made to remove some of the metal elements 3a. In addition, in order to perform such a minute alignment, adjustment metal elements 3a are utilized. For instance in FIG. 7B, two sizes of the metal elements 3 in different thicknesses ("a"=1.8 mm, "b"=1.7 mm) are shown. The thickness "a" of the metal element 3a is used under normal conditions and thickness "b" is used for adjustments.

However, in the above-mentioned conventional prior art, namely, in the case of using a "feeler gauge" measurement tool for inspecting the clearances between the metal elements 3a, there are a variety of feeler gauges with a measuring blade for each size clearance. Thus, it is necessary to measure clearances by constantly exchanging blade sizes which not only wastes time and effort but makes this an annoying problem.

Therefore, the object of the present invention is to provide a CVT belt inspection device which can be used easily and efficiently to measure the clearance between metal elements in a onetime operation.

SUMMARY OF THE INVENTION

The present invention comprises an inspection device which is designed for a large number of consecutively attached metal elements punched and processed into a specified shape and used for inspecting clearance between the metal elements of a continuously variable transmission belt which are assembled to support a laminated band of a metal stepless belt; and the clearance value is inspected quantitatively with a wedge-shaped inspection jig.

Additionally, in the preferred embodiments of the present invention inspection device used for inspecting the clearance between the metal elements, an inspection jig comprises a modified hexahedron having six surfaces containing an upper surface and a lower surface opposing four side surfaces of which both of two side surfaces are a rectangle and the remaining two side surfaces are a wedge-shape which becomes gradually narrower in width from an upper part to a lower part.

Also, according to the present invention designed for a large number of consecutively attached metal elements punched and processed into a specified shape and used for inspecting quantitatively a clearance value between the metal elements of a continuously variable transmission belt which are assembled to support a laminated band of a metal stepless belt; and the clearance value is inspected quantitatively with a step-wise inspection jig.

Moreover, in the preferred embodiments of the present invention inspection device used for inspecting the clearance between the metal elements, an inspection jig comprises a modified hexahedron having six surfaces of which both an upper surface and a lower surface are a rectangle and opposing two side surfaces are a shape which becomes gradually narrower in width by incremental steps from an upper part to a lower part.

Furthermore, the preferred embodiments of the present invention of an inspection device comprise a table for placing the continuously variable belt; and an insertion means for inserting the inspection jig into clearance between random metal elements of a continuously variable transmission belt placed on the table by predetermined force.

Additionally, in the preferred embodiments of the present invention of an inspection device, an insertion means configuration includes an upward movement mechanism for moving the inspection jig to a predetermined upper position; and a downward movement means for downward movement of the inspection jig moved to that upward movement position by predetermined force.

Also, in the preferred embodiments of the present invention of an inspection device, the downward movement means comprises a load cell of predetermined mass.

In addition, in the preferred embodiments of the present invention of an inspection device, the inspection jig further comprises a collapse prevention portion for preventing collapse of metal elements positioned on both sides of clearance between the metal elements.

According to the present invention, a particular clearance value can be inspected quantitatively by examining whether or not the inspection jig is inserted in the clearance between metal elements by a predetermined force and how much of the wedge-shaped portion is inserted. Consequently, unlike the conventional prior art, this inspection jig eliminates the need for exchanging feeler gauge measuring blades repeatedly one by one and the clearance between metal elements is more easily measured in a onetime operation.

Additionally, according to the preferred embodiments of the present invention, a particular clearance value can be inspected quantitatively by examining whether or not a step-wise inspection jig is inserted in the clearance between metal elements by a predetermined force and how much of the step-wise portion is inserted. Accordingly, as compared to conventional prior art, in addition to eliminating the need for exchanging feeler gauge measuring blades one by one repeatedly and being able to more easily measure the clearance between metal elements in a onetime action, the clearance value can be measured for each step-wise level difference. As a result, the mean value between level differences is not measured and recurrently precise measurement results can be obtained.

Moreover, according to the preferred embodiments of the present invention, the heretofore manual task of measuring the clearance between metal elements can be automated.

Finally, according to the preferred embodiments of the present invention, in particular because collapsing (topple over) of the metal elements positioned on both sides of the clearances between the metal elements is prevented, the time inconvenience in measuring wide clearances equivalent to the layered width of a several or many of the metal elements can also be avoided.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIGS. 7A~7B are enlarged views of a metal element 3a.

DETAILED DESCRIPTION OF THE PREFERRED EMBODIMENTS

The preferred embodiments of the present invention will hereinafter be described in detail with reference to the drawings. Additionally, illustration of specific or example numerical values for various details in the following explanation or character strings and other symbols are merely references to clarify the concept of the present invention. Accordingly, the concept of the present invention should not be limited explicitly to this terminology entirely or in part.

In addition, explanation is omitted which describes details of well-known methods, well-known procedures, well-known architecture, well-known circuit configurations, etc. (hereinafter denoted as "common knowledge") for the purpose of concise explanation, but does not intentionally exclude this common knowledge entirely or in part. Therefore, relevant common knowledge already known by persons skilled in the art at the time of filing the present invention is naturally included in the following description.

<First Embodiment>

Figure 1:
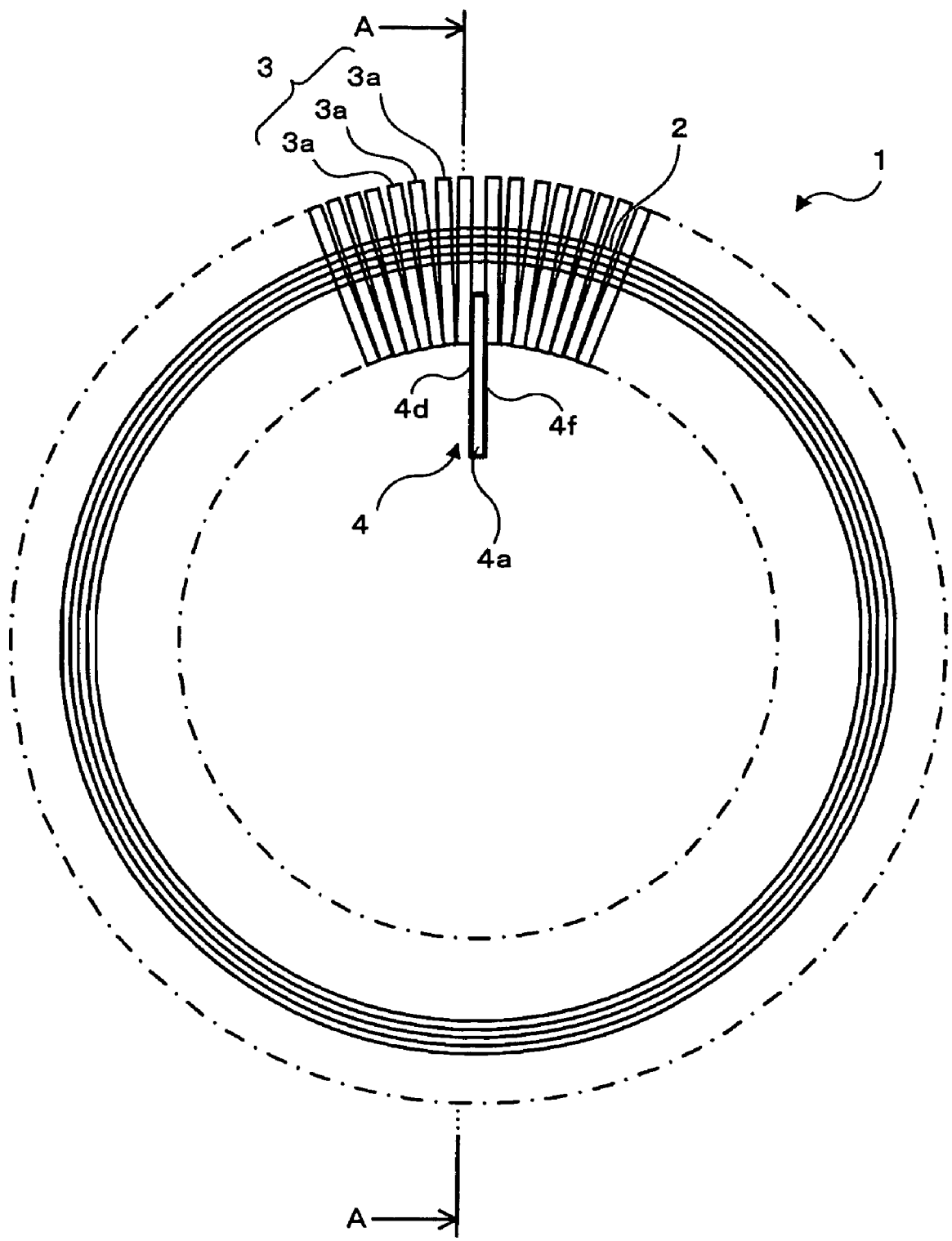
FIG. 1 is a configuration diagram of the first embodiment.

FIG. 1 is a configuration diagram of the first embodiment. In this diagram as also described in the beginning, a Continuously Variable Transmission (CVT) belt 1 is constructed by assembling two belt laminated bands 2 composed of a plurality of steel belt bands (for example, a laminated band composed of about 12 endless belt layers) which are supported by consecutively attached elements 3 composed of a large number of metal elements 3a (for example, about 400 steel elements). Additionally, the structure of the illustration is a diagram as seen from a horizontal direction. Also, one of the two belt laminated bands 2 is hidden behind the other and not visible.

As seen in FIG. 1, a CVT belt inspection jig 4 is inserted into the clearance between the metal elements 3a on the inner periphery side of the CVT belt 1.

Figure 2A:
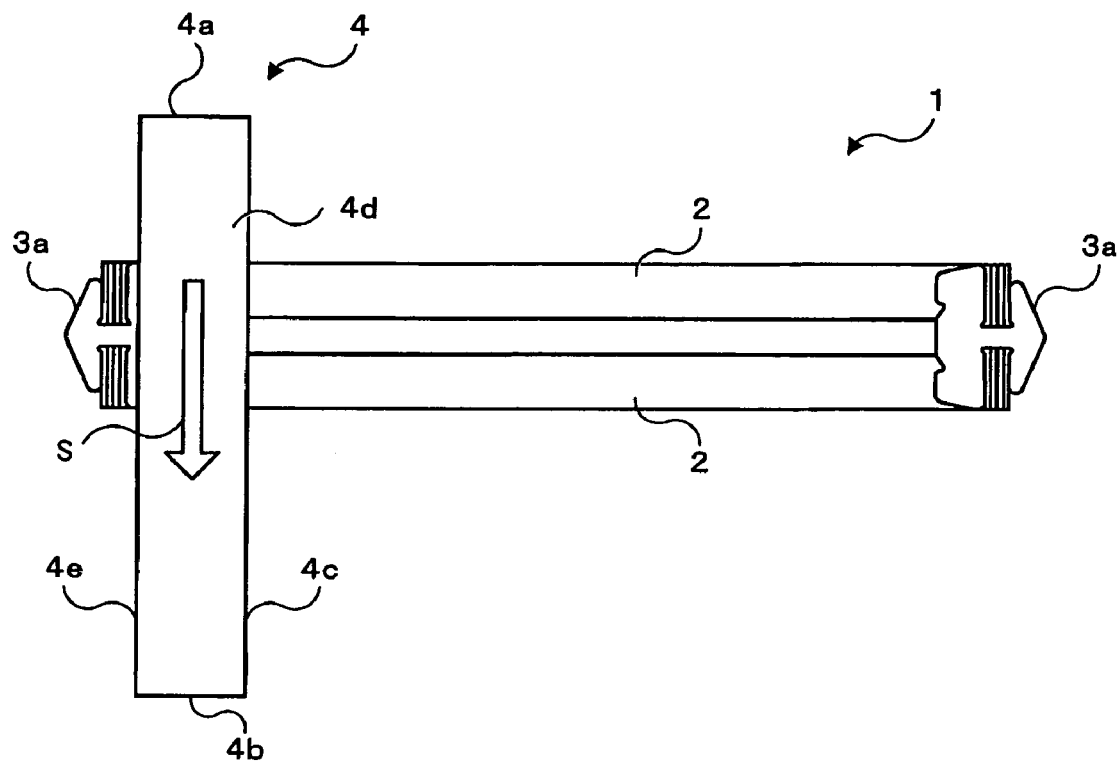
FIGS. 2A~2C are perspective diagrams of an inspection jig 4 in the FIG. 1 A—A arrow view and a configuration diagram in the second embodiment that improves the first embodiment.
Figure 2B:
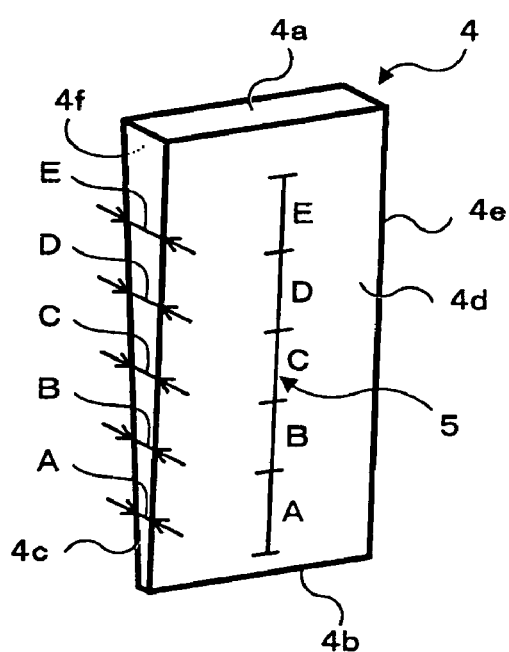

FIG. 2 is a perspective diagram of the inspection jig 4 in the FIG. 1 A—A arrow view and FIG. 2B. In these drawings, the inspection jig 4 is a modified hexahedron having six surfaces 4a~4f. Specifically, dimensions containing an upper surface 4a and a lower surface 4b opposing four side surfaces 4c~4f of which both of two side surfaces 4d, 4f are a rectangle (oblong) and the remaining two side surfaces 4c, 4e are a "wedge-shape" (tapering block) which becomes gradually narrower in width from an upper part to a lower part.

Referring to FIG. 2B, a scale 5 is drawn on the inspection jig 4 side surface 4d. This scale represents the width in each position of the wedge-shaped side surfaces 4c, 4e. For the moment the width in each position of the wedge-shaped side surfaces 4c, 4e is expressed as "A", "B", "C", "D" and "E" for convenience of explanation. Here, A<B<C<D<E with the width "A" being the minimum, width "E" being maximum and width "B" to width "D" being mean values.

When measuring the clearance between the metal elements 3a on the inner periphery side of the CVT belt 1 using the inspection jig 4 having such a structure and as shown in FIG. 2 or FIG. 2A, initially, the inspection jig 4 minimum width portion (namely, the lower surface 4b) is inserted into the clearance between measuring objects. Subsequently, as shown as arrow "S" in FIG. 2A, predetermined force is applied from the inspection jig 4 upper surface 4a and examined to determine the insertion depth of the wedge-shaped side surfaces 4c, 4e.

By reading the scale 5 notation of the insertion position while applying predetermined force, the clearance between the metal elements 3a on the inner periphery side of the CVT belt 1 can be specifically measured. Furthermore, based on this inspection jig 4, clearances from width "A" through width "E" can be extensively measured with a single tool. Accordingly, unlike conventional methods the inspection jig 4 eliminates the need for exchanging feeler gauge measuring blades repeatedly one by one. For this reason, the clearance between the metal elements 3a can be simply measured in a onetime operation and a major improvement in work efficiency can be achieved.

<Second Embodiment>

Figure 2C:
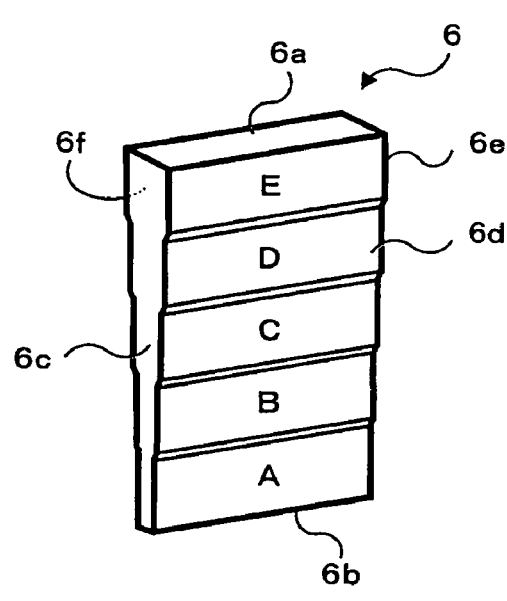

FIG. 2C is a configuration diagram of the second embodiment that improves the first embodiment. As seen in this diagram, unlike the first embodiment which varies width "A" through width "E" uniformly, the second embodiment gradually varies widths by incremental steps.

Although an inspection jig 6 of the second embodiment is also a modified hexahedron having six surfaces 6a~6f and is common with the first embodiment in that the upper surface 6a and the lower surface 6b are a rectangle (oblong), the inspection jig 6 is different from the first embodiment in the shape of the other surfaces 6c~6f.

Specifically, the opposing two surface sides 6c, 6e become gradually narrower in width by "incremental steps" from the upper part to the lower part and the side surface 6d, 6f. Also, the two remaining sides 6d, 6f are different in the respect that both are segmented step-wise according to the level differences of the side surfaces 6c, 6e. Also, the "A", "B", ... "E" inscribed on each divided segment on the side surfaces 6d, 6f for convenience of explanation represent the corresponding width portions of the side surfaces 6c, 6e.

Also, when measuring the clearance between the metal elements 3a on the inner periphery side of the CVT belt 1 using the inspection jig 6 having such a structure and similar to the inspection jig 4 of the first embodiment, initially, the inspection jig 6 minimum width portion (namely, the lower surface 6b) is inserted into the clearance between measuring objects. Subsequently, as shown as arrow "S" in FIG. 2A, predetermined force is applied from the inspection jig 6 upper surface 6a and examined to determine the insertion depth of the side surfaces 6c, 6e.

By reading the width notation of the insertion position while applying predetermined force, the clearance between the metal elements 3a on the inner periphery side of the CVT belt 1 can be specifically measured. Furthermore, based on this inspection jig 6, clearances from width "A" through width "E" can be extensively measured with a single tool. Accordingly, unlike conventional methods, the inspection jig 4 eliminates the need for exchanging feeler gauge measuring blades repeatedly one by one. For this reason, the clearance between the metal elements 3a can be simply measured in a onetime operation and a major improvement in work efficiency can be achieved.

Furthermore, in this inspection jig 6, because the width of the side surfaces 6c, 6e is varied by "incremental steps", the distinctive effect is that improved recurring measurements can be acquired.

Specifically, because the measurement increments of inspection jig 4 of the first embodiment do not extend beyond wedge-shaped side surfaces 4c, 4e, the actual measurement may be at a point between adjacent widths(for example, width "A" and width "B"). In such a case, as judgment wavers in establishing which is width "A" and width "B" or the mean value as well as considering the judgment of each worker which is naturally different from person to person, the inspection jig 4 is inadequate in regards to repeatability. However, since the inspection jig 6 has a level difference established between adjacent widths (for example, width "A" and width "B"), constant measurements (for example, width "A" and width "B") can always be precisely determined provided that the level difference is not forcefully transcended. Also, each worker's perplexity in properly judging level measurement differences does not occur. Consequently, there is an exceptional merit in that favorable repeatability of precise measurements is acquired.

<Third Embodiment>

Figure 3:
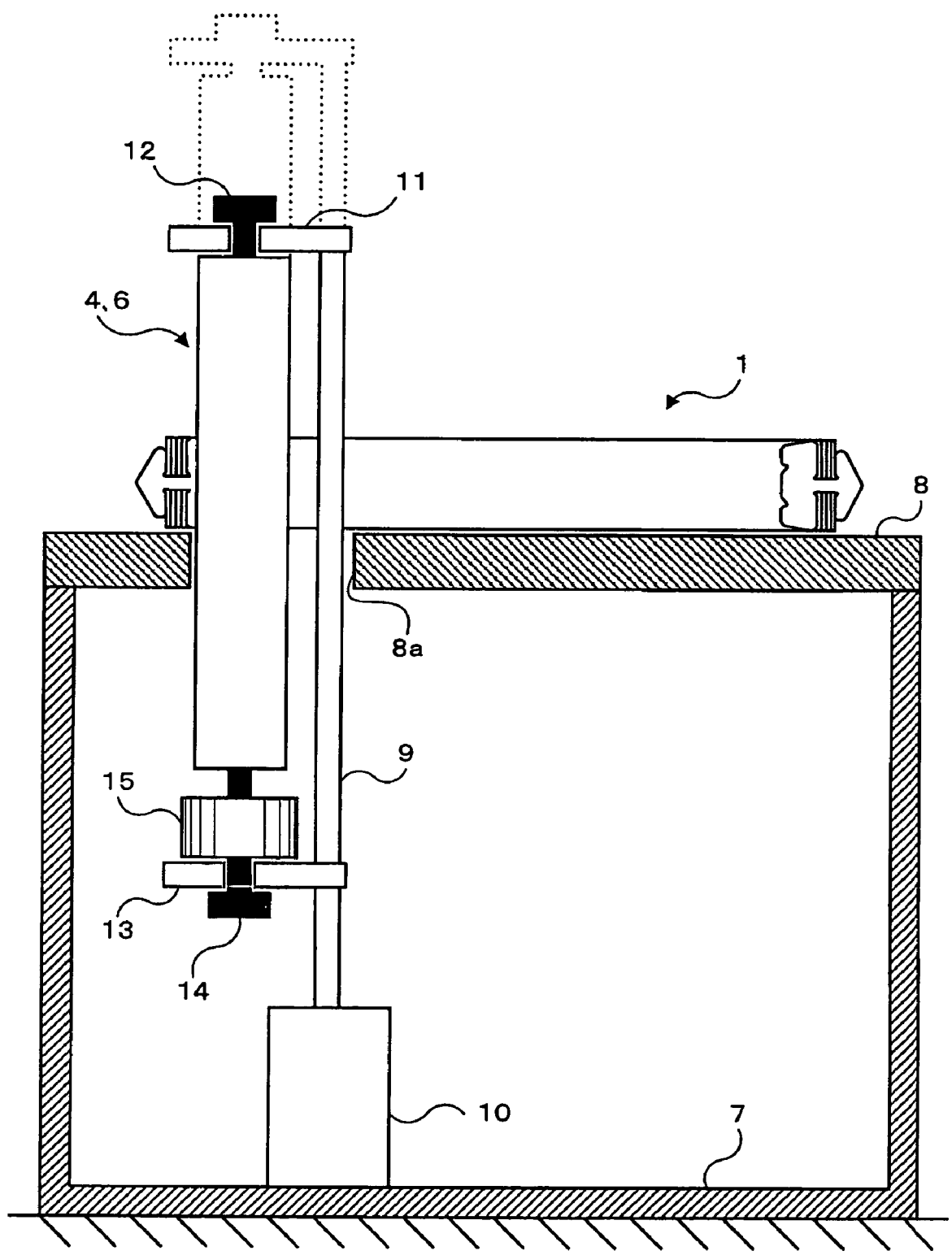
FIG. 3 is a configuration diagram of the third embodiment.

FIG. 3 is a configuration diagram of the third embodiment which automates inspection with the inspection jigs 4, 6 of the above-mentioned first embodiment and second embodiment. In this diagram, a table 8 is placed above a frame 7 on top of a floor surface, etc. and a CVT belt 1 is situated above the table 8. An arm 9 which extends in an upward and downward sliding direction is inserted in an opening 8a of the table 8 which has sufficient clearance.

The lower end of the arm 9 is connected with an upward movement mechanism 10 (insertion means), such as a servo, etc., which is extended by operating the upward movement mechanism 10 to a predetermined upper position as illustrated with the dotted lines in FIG. 3.

Additionally, a crossbar 11 is attached to the upper end of the arm 9. The upper end of the inspection jig 4 of the first embodiment or the inspection jig 6 of the second embodiment is attached to a metal fitting 12 which latches to the crossbar 11.

Furthermore, a crossbar 13 is also attached near the intermediate portion of the arm 9. The lower end of the inspection jig 4 of the first embodiment or the inspection jig 6 of the second embodiment is attached to a metal fitting 14 which latches to the crossbar 13. The metal fitting 14 is equipped with a load cell 15 (downward movement means) of predetermined mass.

In such a structure, when measuring the clearance between the metal elements 3a on the inner periphery side of the CVT belt 1, initially, the upward movement mechanism 10 is operated. The arm 9 is extended to the maximum upper position which makes it possible for the lower end of the inspection jig 4 of the first embodiment or the inspection jig 6 of the second embodiment to slightly enter the clearance between the metal elements 3a on the inner periphery side of the CVT belt 1.

Subsequently, in this state when operation of the upward movement mechanism 10 is stopped, the arm 9 performs a free fall descent with the weight of the load cell 15. As a result, the lower end of the inspection jig 4 of the first embodiment or the inspection jig 6 of the second embodiment deeply enters the clearance between the metal elements 3a on the inner periphery side of the CVT belt 1.

At this point the penetration amount by the mass of the load cell 15 and the size of the actual clearance between the metal elements 3a is determined. For example, when the inspection jig 4 of the first embodiment is used, the scale 5 notation ("A"–"E") can be read or when the inspection jig 6 of the second embodiment is used, the level difference portion notation ("A"–"E") can be read. The read value is the actual clearance, namely, the clearance value generated when the metal elements 3a are spread apart by predetermined force (the mass of the load cell 15) will be shown.

Moreover, the automated reading of clearances, for example, comprises a sensor which detects the amount of free fall descent of the arm 9.

<Fourth Embodiment>

Figure 4:
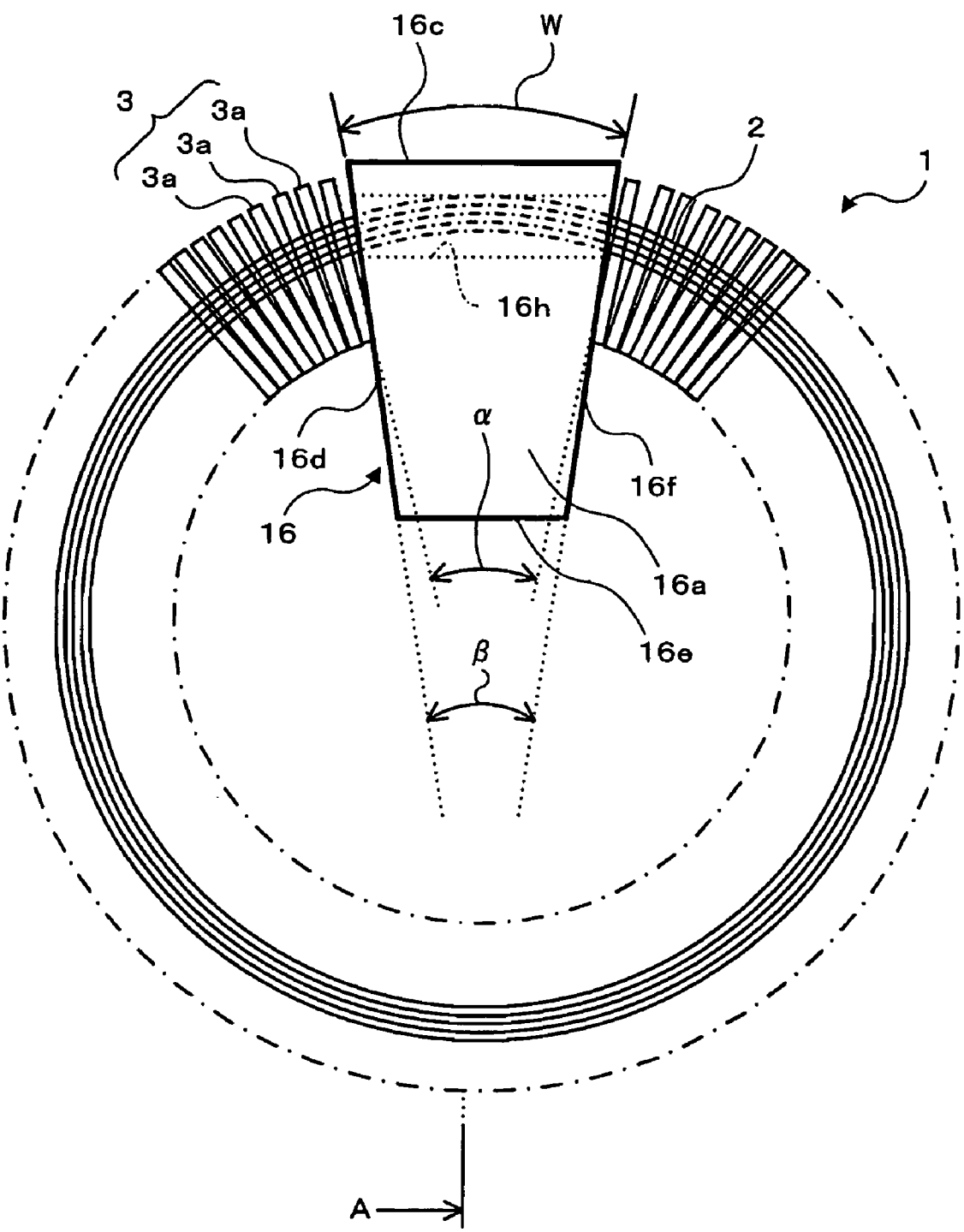
FIG. 4 is a configuration diagram of the fourth embodiment.

FIG. 4 is a configuration diagram of the fourth embodiment. The clearance size between measuring objects is different from the above-mentioned first embodiment or the second embodiment. The inspection jigs 4, 6 of the above-mentioned first embodiment or the second embodiment measure the clearance between the metal elements 3a of an assembled CVT belt 1. These clearances are very infinitesimal because the metal elements 3a are densely inserted. In this fourth embodiment, an inspection jig 16 is different in that this tool can measure the clearances (wider clearances equivalent to the layered width of several or many of the metal elements 3a) before the metal elements 3a are densely inserted.

Referring to FIG. 4, the CVT belt 1 corresponds to a measuring object wherein several or many of the metal elements 3a are removed or it corresponds to a measuring object before the metal elements 3a are completely inserted. In the diagram the letter "W" indicates a wider clearance equivalent to the layered width of several or many of the metal elements 3a. The inspection jig 16 is inserted into this clearance "W."

Figure 5:
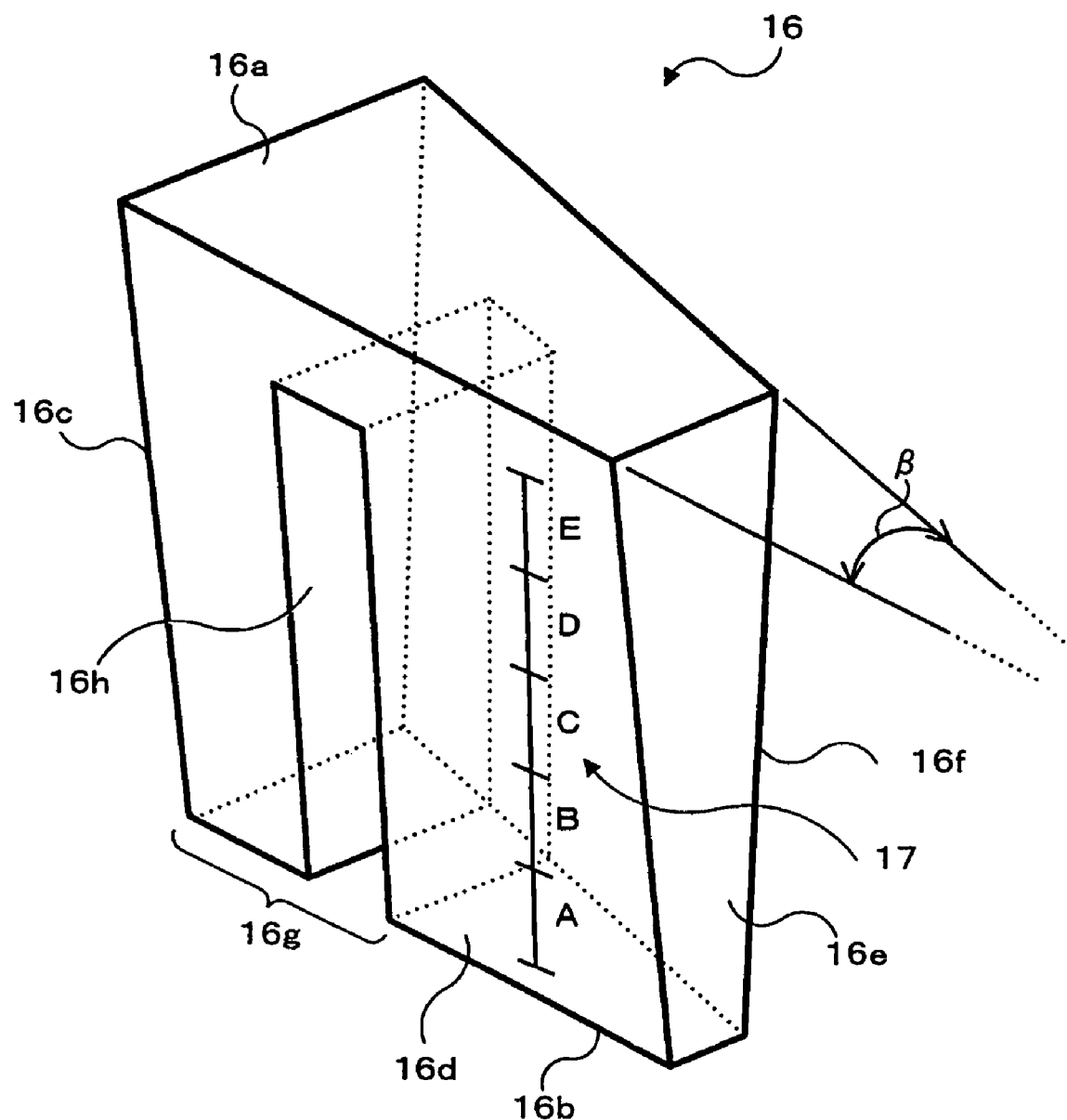
FIG. 5 is an outline view of an inspection jig 16.
Figure 6:
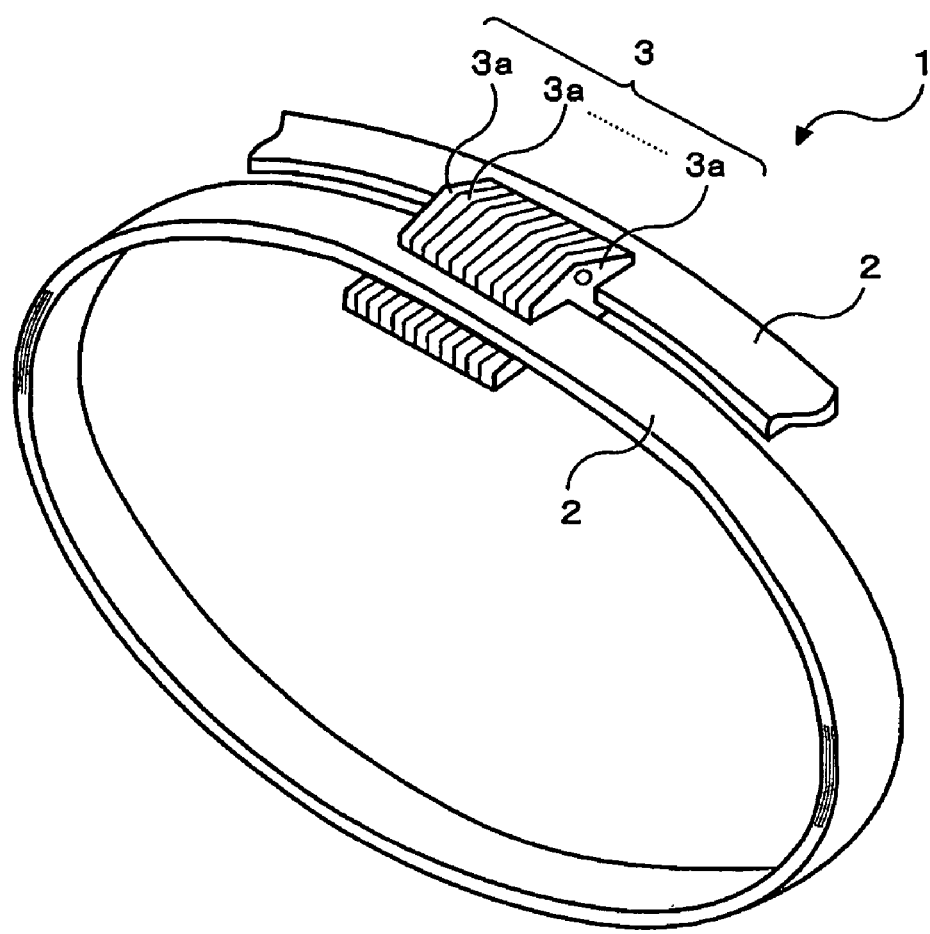
FIG. 6 is an outline view of a Continuously Variable Transmission belt.
Figure 7A:
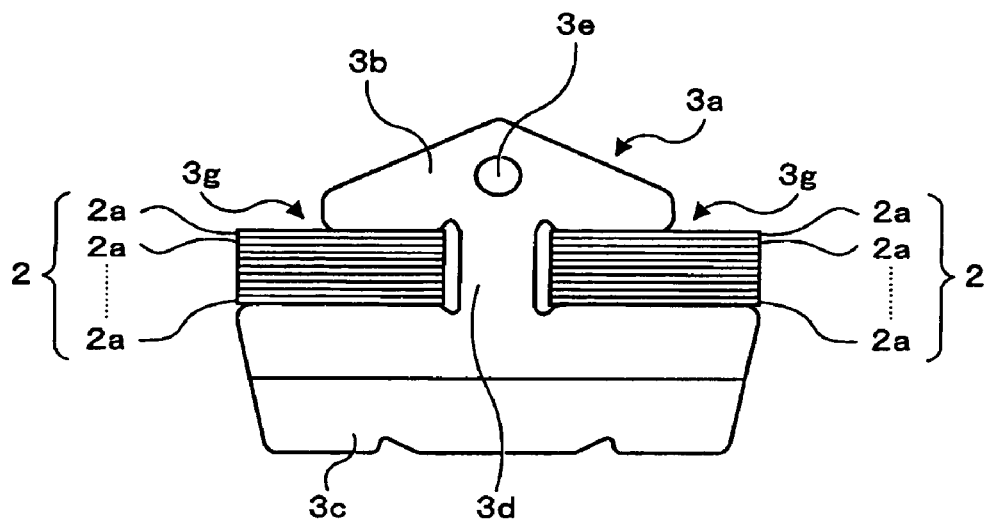
Figure 7B:
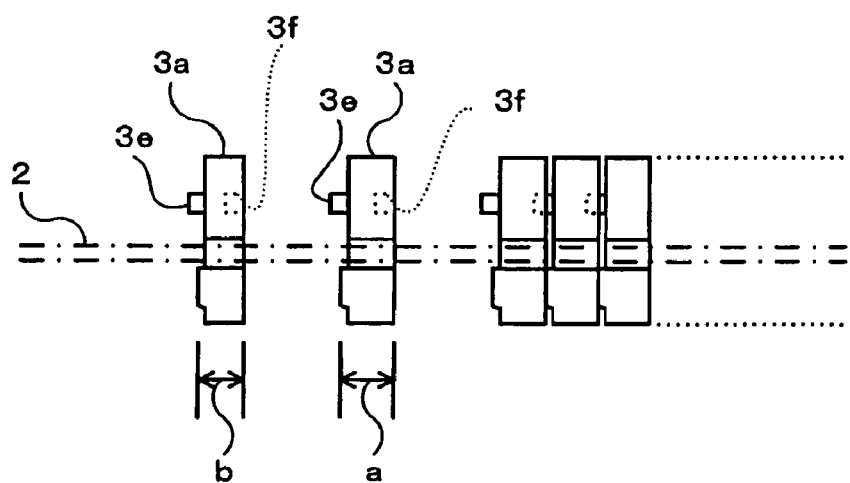

FIG. 5 is an outline view of the inspection jig 16. This inspection jig like the inspection jigs 4, 6 of the above-mentioned first embodiment or second embodiment is a modified hexahedron with six surfaces 16a~16f. In detail, the upper surface 16a and the lower surface 16b have a fan-like shape (resembles a handheld fan) with a metal element 3a opening angle α and a substantially equivalent or slightly smaller angle β positioned on both sides of the clearance "W".

Furthermore, among the four side surfaces 16c~16f, two side surfaces 16d, 16f are both a rectangle (oblong). The remaining two sides 16c, 16e are a "wedge-shape" (tapering block) which becomes gradually narrower in width from an upper part to a lower part.

Also, because this inspection jig 16 measures the clearance "W" which is much wider than the inspection jigs 4, 6 of the first embodiment or the second embodiment, a collapse prevention portion 16g is added for preventing collapse (toppling over) of the metal elements 3a on both sides of the clearance "W". This collapse prevention portion 16g includes a slot 16h for passage of the belt laminated bands 2.

A scale 17 is drawn on the inspection jig 16 side surface 16d like the inspection jig of the first embodiment. This scale represents the width in each position of the wedge-shaped side surfaces 16c, 16e.

When measuring the wider clearance "W" of the metal elements 3a of the CVT belt 1 using the inspection jig 16 having such a structure, initially, the inspection jig 16 minimum width portion (namely, the lower surface 16b) is inserted into the clearance "W". Subsequently, predetermined force is applied from the inspection jig 16 upper surface 16a and then examined to determine the insertion depth of the wedge-shaped side surfaces 16c, 16e. By reading the scale 17 notation of the insertion position while applying predetermined force, the clearance "W" between the metal elements 3a of the CVT belt 1 can be specifically measured.

Furthermore, this inspection jig 16 measures much wider clearances than the above-mentioned inspection jigs 4, 6. Although geometrically different from the above-mentioned inspection jigs 4, 6, this measurement tool encompasses a wider width (width from the side surface 16d to 16f) corresponding to the clearance "W". In addition, as described above, the inspection jig 16 is different by comprising the collapse prevention portion 16g for preventing collapse (toppling over) of the metal elements 3a on both sides of the clearance "W" and the slot 16h for passage of the belt laminated bands 2.

If assuming these added portions (the collapse prevention portion 16g and the slot 16h) are not included, this inspection jig 16' (for convenience of explanation, ' is added to the element number for differentiation, i.e., inspection jig 16') can be also be said to have expanded merely the width of the above-mentioned inspection jigs 4, 6. However, when measuring the clearance "W" using this inspection jig 16', as the inspection jig 16' is inserted only in clearance "W" on the inner periphery side of the CVT belt 1, it will be in a free condition (unrestricted) in the clearance of the inner periphery side of the CVT belt 1 (i.e., a state that does not have anything to hold down). Accordingly, because the metal elements 3a on both sides of the clearance "W" on the outer periphery of the CVT belt 1 collapse, ultimately, the clearance "W" on the inner periphery side of the CVT belt 1 spreads more than needed. As a result, the measurement of the clearance "W" by such an inspection jig 16' will become uncertain. On the other hand, the inspection jig 16 comprised with the above added portions (the collapse prevention portion 16g and the slot 16h) will prevent the metal elements 3a from collapsing on both sides of the outer periphery of the CVT belt 1. Thus, the clearance "W" on the inner periphery side of the CVT belt 1 does not spread more than necessary and the clearance "W" can be measured precisely.

Furthermore, although this inspection jig 16 can be considered a modified example of the inspection jig 4 of the above-mentioned first embodiment because of its wedge-shaped outer appearance, this inspection jig is not restricted to this, for example, an equivalent tool having a step-wise outer shape. Namely, the modified example of the inspection jig 6 of the above-mentioned second embodiment.

While the present invention has been described with reference to the preferred embodiments, it is intended that the invention be not limited by any of the details of the description therein but includes all the embodiments which fall within the scope of the appended claims.

What is claimed is:

1. A continuously variable transmission belt inspection device which is designed for a large number of consecutively attached metal elements punched and processed into a specified shape and used for inspecting clearance between said metal elements of a continuously variable transmission belt which are assembled to support a laminated band of a metal stepless belt; and said clearance value is inspected quantitatively with a wedge-shaped inspection jig, wherein said inspection jig comprises a modified hexahedron having six surfaces containing an upper surface and a lower surface opposing four side surfaces of which both of two side surfaces consisting of one plane that continues respectively are a rectangle and the remaining two side surfaces are a wedge-shape which becomes gradually narrower in width from an upper part to a lower part.

2. The continuously variable transmission belt inspection device according to claim 1 comprises:

a table for placing said continuously variable belt; and an insertion means for inserting said inspection jig into clearance between random metal elements of a continuously variable transmission belt placed on said table by predetermined force.

3. The continuously variable transmission belt inspection device according to claim 2, wherein said insertion means configuration includes:

an upward movement mechanism for moving said inspection jig to a predetermined upper position; and a downward movement means for downward movement of said inspection jig moved to that upward movement position by predetermined force.

4. The continuously variable transmission belt inspection device according to claim 3, wherein said downward movement means comprises a load cell of predetermined mass.

5. The continuously variable transmission belt inspection device according to claim 1, wherein said inspection jig further comprises a collapse prevention portion for preventing collapse of metal elements positioned on both sides of clearance between said metal elements.

* * * * *